(12) United States Patent
Cheng et al.

(10) Patent No.: US 7,521,015 B2
(45) Date of Patent: Apr. 21, 2009

(54) CURABLE THIOL-ENE COMPOSITIONS FOR OPTICAL ARTICLES

(75) Inventors: Ming Cheng, Woodbury, MN (US); Peter M. Olofson, Oakdale, MN (US); Michele A. Craton, Cottage Grove, MN (US); Ying-Yuh Lu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 595 days.

(21) Appl. No.: 11/187,526

(22) Filed: Jul. 22, 2005

(65) Prior Publication Data

US 2007/0021521 A1 Jan. 25, 2007

(51) Int. Cl.
*B29C 35/08* (2006.01)
*G02B 1/04* (2006.01)
*C08G 18/67* (2006.01)
*C08G 75/04* (2006.01)
*C08J 3/28* (2006.01)

(52) U.S. Cl. .................. 264/496; 359/642; 528/65; 528/376; 522/96; 522/173; 522/180

(58) Field of Classification Search ............... 522/173, 522/181, 96, 180; 528/376, 65; 359/642; 264/496

See application file for complete search history.

(56) References Cited

U.S. PATENT DOCUMENTS

| | | | |
|---|---|---|---|
| 3,697,396 A * | 10/1972 | Kehr et al. ............ | 522/23 |
| 3,697,621 A * | 10/1972 | Kehr et al. ............ | 525/440.07 |
| 4,139,385 A | 2/1979 | Crivello | |
| 4,234,676 A | 11/1980 | Hein et al. | |
| 4,391,686 A * | 7/1983 | Miller et al. ............ | 522/13 |
| 4,512,340 A * | 4/1985 | Buck ............ | 602/2 |
| 4,808,638 A | 2/1989 | Steinkraus et al. | |
| 4,932,750 A | 6/1990 | Ansel et al. | |
| 5,459,175 A | 10/1995 | Woods et al. | |
| 5,527,835 A * | 6/1996 | Shustack ............ | 522/42 |
| 5,744,514 A * | 4/1998 | Shustack ............ | 522/42 |
| 5,847,021 A | 12/1998 | Tortorello et al. | |
| 5,876,805 A | 3/1999 | Ostlie | |
| 5,977,276 A | 11/1999 | Toh et al. | |
| 6,153,663 A | 11/2000 | Chen et al. | |
| 6,313,251 B1 | 11/2001 | Toh et al. | |
| 6,472,451 B2 * | 10/2002 | Ha et al. ............ | 522/97 |
| 6,476,974 B1 | 11/2002 | Kreitzer | |
| 6,506,814 B2 | 1/2003 | Krongauz et al. | |
| 6,605,691 B1 | 8/2003 | Gross et al. | |
| 6,669,873 B1 | 12/2003 | Smith et al. | |

(Continued)

FOREIGN PATENT DOCUMENTS

EP 1 477 511 A1 11/2004

(Continued)

OTHER PUBLICATIONS

Cramer et al., "Photopolymerizations of Thiol-Ene Polymers Without Photoinitiators", Macromolecules, (2002), pp. 5361-5365, vol. 35, No. 14, American Chemical Society.

*Primary Examiner*—Susan W Berman
(74) *Attorney, Agent, or Firm*—Kent S. Kokko

(57) ABSTRACT

Curable thiol-ene compositions containing urethane (meth) acrylate oligomers that are readily polymerized to produce optical articles and coatings are described.

20 Claims, 1 Drawing Sheet

U.S. PATENT DOCUMENTS

| | | |
|---|---|---|
| 6,759,121 B2 | 7/2004 | Alahapperuma et al. |
| 6,765,731 B1 | 7/2004 | Cannon |
| 6,791,629 B2 | 9/2004 | Moskovich et al. |
| 6,853,493 B2 | 2/2005 | Kreitzer |
| 7,067,564 B2 * | 6/2006 | Bulters et al. .................. 522/96 |
| 2004/0174608 A1 | 9/2004 | Moskovich |

FOREIGN PATENT DOCUMENTS

| | | |
|---|---|---|
| JP | 63-207805 | 8/1988 |
| JP | 5-93070 | 4/1993 |
| WO | WO 99/57733 A1 | 11/1999 |
| WO | WO 02/44295 A2 | 6/2002 |
| WO | WO 2005/019369 A1 | 3/2005 |

* cited by examiner

CURABLE THIOL-ENE COMPOSITIONS FOR OPTICAL ARTICLES

FIELD OF THE INVENTION

The present invention provides curable thiol-ene compositions containing urethane (meth)acrylate oligomers that are readily polymerized to produce optical articles and coatings.

BACKGROUND OF THE INVENTION

Radiation curable compositions containing carbon-carbon unsaturated monomers and polythiols were developed in the early 1970s. U.S. Pat. No. 4,234,676 (Hein et al.) describe a composition comprising a carbon-carbon unsaturated polymer, a crosslinkable monomer, a polythiol, and curing agent directed primarily at printing plate production.

U.S. Pat. No. 4,808,638 (Steinkraus, et al) describes a composition comprising a norbornene resin, polythiol, and free radical initiator that can be photocured in visible light when an iron arene complex is present.

U.S. Pat. No. 4,139,385 (Crivello) describes a composition comprising a polyolefin, polythiol, and onium salt photoinitiator. The films, 75 micrometers thick (3 mil), were curable by a cationic mechanism with UV light as an initiator.

U.S. Pat. No. 6,506,814 (Krongauz et al.) describes a UV curable insulating composition for electrical conductors comprising a UV or radiation curable (meth)acrylate oligomer, an acid functional adhesion promoter or thiol compound, a vinyl reactive diluent and a photoinitiator.

SUMMARY OF THE INVENTION

The present invention includes a photopolymerizable composition comprising an aliphatic urethane (meth)acrylate oligomer, a polythiol, optionally a reactive diluent, and optionally a photoinitiator. The inventive composition can be made free of solvent and unreactive species and can be rapidly photocured. The composition, when cured is non-yellowing, exhibits low shrinkage and low birefringence making it suitable for many optical applications such as optical lenses, optical fibers, prisms, light guides, optical adhesives, and optical films.

The present invention addresses the needs of the industry, by providing a rapid cure, near 100% solids, solvent free, photopolymerizable composition, to produce thick precision optics such as optical lens, light guide, prisms, etc., with low birefringence for applications in electronic displays, cameras, binoculars, fax machines, bar code scanners, optical communication devices. The present invention is especially useful in preparing optical lenses such as those used in lenses used in projection televisions, such as are described in U.S. Pat. No. 6,765,731 (Canon), U.S. Pat. No. 6,476,974 (Kreitzer), U.S. Pat. No. 6,853,493 (Kreitzer), and U.S. Pat. No. 6,791,629 (Moskovich et al.), incorporated herein by reference.

Advantageously, the present invention provides curable compositions that are readily melt processable without appreciable monomers, reactive diluents and photoinitiators. Curable systems containing a significant amount of solvent, monomers and reactive diluents can give rise to a significant increase in density when transformed from the uncured to the cured state causing a net shrinkage in volume. As is well known, shrinkage can cause unpredictable registration in precise molding operations such as those required in manufacture of optical elements such as lenses. Shrinkage can also create residual stress in such optical articles, which can subsequently lead to optical defects, including high birefringence.

DETAILED DESCRIPTION

Figure 1:
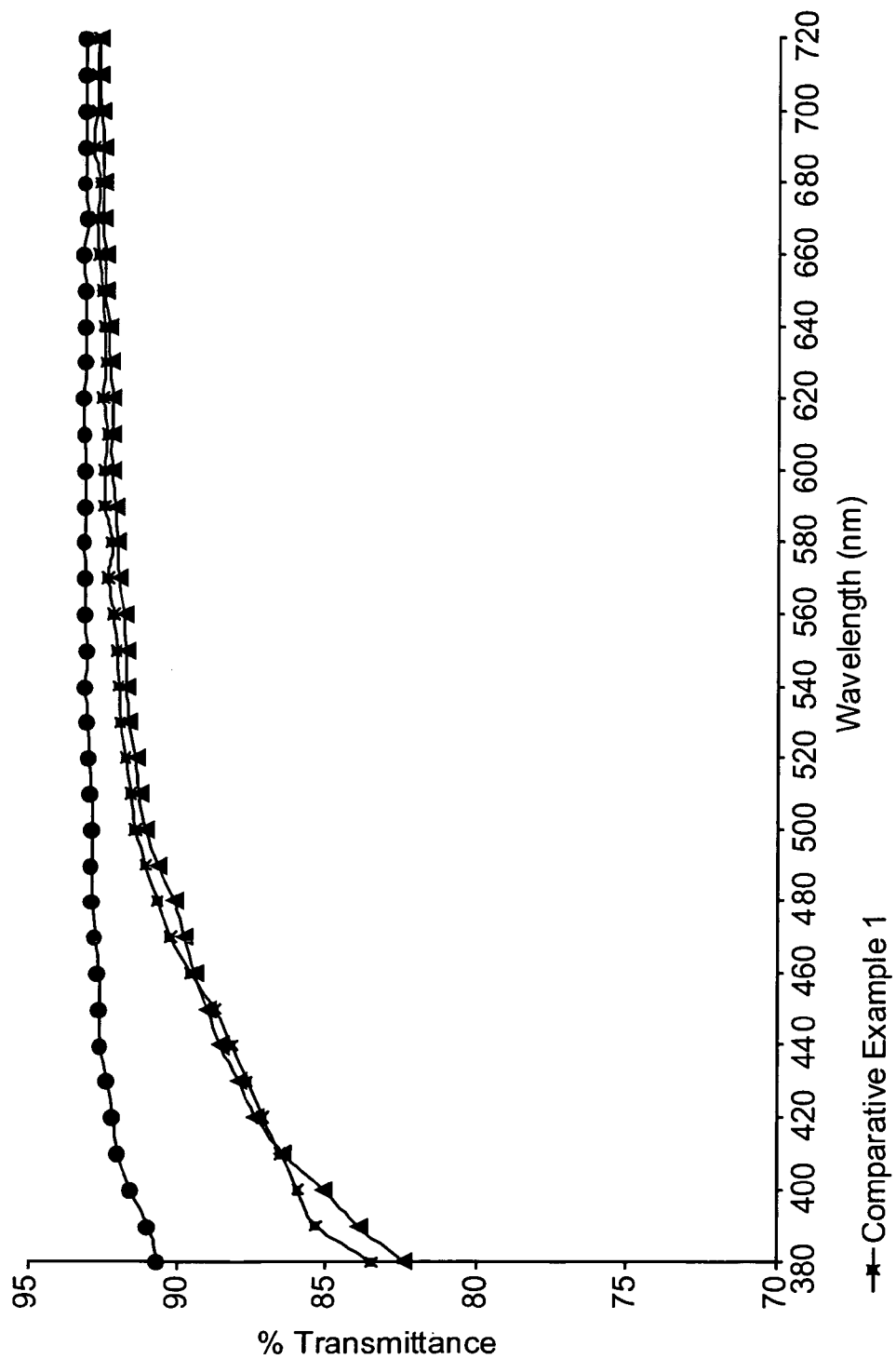
FIG. 1 shows the transmittance spectra of Example 1 and Comparative Examples 1 and 2.

The present invention provides curable materials comprising one or more aliphatic urethane (meth)acrylate oligomers and one or more polythiols to minimize stress and birefringence in the cured materials Thiol-ene polymerization is a step-growth polymerization that can induce less stress during polymerization due to delayed gelation. In some embodiments, the present invention provides initiator-free thiol-ene curable materials with low shrinkage, residual stress and birefringence that is optically clear and non-yellowing for applications in precision optics and electronic displays.

The use of photoinitiators is generally disadvantageous. First, the photoinitiators degrade over time leading to yellowing of the cured material. The yellowness makes it undesirable for many optical applications, which generally require colorless, non-yellow, low haze, and high transparency materials. By the term "colorless" it is meant that the cured composition has essentially no visible color to the eye in the visible range and preferably has an absorbance for visible radiation (i.e., from about 400 to 700 nm) of less than about 0.1.

Second, the curing depth in photopolymerizations is limited by the attenuation of ultraviolet or visible light by the photoinitiator, making relatively thick coatings or three-dimensional objects (such as lenses) difficult to prepare. In addition, photoinitiator molecules can be toxic and expensive. The present invention provides curable materials without photoinitiators to prevent yellowing from the photoinitiator, and improve depth of photopolymerization in the curable materials.

The composition of the present invention minimizes shrinkage and residual stress due to monomer and reactive diluent polymerization. The low shrinkage compositions of this invention are particularly useful in molding applications or in any applications where accurate molding and/or registration is required. The present invention provides new compositions that may be formulated as 100% solids, cured by free-radical means and that exhibit properties that meet or exceed those of the art. The present invention provides compositions that exhibit less than 7% shrinkage, and preferably less than 5%.

The articles of the invention may have a thickness greater than about 0.5 millimeters, an index of refraction greater than about 1.45 and less than about 1.75, generally a birefringence of less than $1\times10^{-5}$, light transmission greater than about 85%, preferably greater than 90%, and a CIELAB b* units less than about 1.5, preferably less than about 1.0 for samples with thickness of 4.8 millimeters.

As used herein:

"Actinic radiation" means photochemically active radiation and particle beams. Actinic radiation includes, but is not limited to, accelerated particles, for example, electron beams; and electromagnetic radiation; for example, microwaves, infrared radiation, visible light, ultraviolet light, X-rays, and gamma-rays. The radiation can be monochromatic or polychromatic, coherent or incoherent, and should be sufficiently intense to generate substantial numbers of free radicals in the actinic radiation curable compositions used in the inventive compositions.

"(Meth)acrylic groups" means both acrylic and methacrylic groups.

"Ethylenically unsaturated groups" include, but are not limited to, vinyl, (meth)acrylic and the like.

"Step-growth process" means reaction to form a covalent bond between organic functional groups possessing a complementary reactivity relationship, i.e., electrophile-nucleophile. The process may occur by functional group rearrangement in the case of step-growth addition or by the elimination of a small molecule such as water or an alcohol in the case of step-growth condensation.

"Melt processible" is used to refer to oligomer compositions that possess or achieve a suitable low viscosity for coating or molding at temperatures less than or equal to 100° C., using conventional molding or coating equipment without the need for the addition of solvents, plasticizers and/or viscosity modifiers and without the need for extraordinary pressures.

"Photocuring" and "photopolymerization" are used interchangeably in this application to indicate an actinic radiation induced chemical reaction in which relatively simple molecules combine to form a chain or net-like macromolecule.

"100% solids" means a composition free of unreactive species, such as solvents.

"Polythiols" refers to simple or complex organic compounds which are substantially free of disulfide linkages and have a multiplicity of pendant or terminally positioned —SH functional groups per molecule.

"Transmittance" of radiant energy refers to the passage of radiant energy through a material.

"Transparency" may be considered as a degree of regular transmission, and thus the property of a material by which objects may be seen clearly through a sheet thereof. A transparent material transmits light without diffusion or scattering.

The present invention provides a polymerizable thiol-ene composition comprising at least one urethane (meth)acrylate oligomer, at least one polythiol; optionally at least one reactive diluent component and optionally a free radical polymerization photoinitiator, or blend of photoinitiators, which may be photopolymerized.

The present invention also provides a method for preparing cast optical articles comprising the steps of:

(1) mixing the components to form an optical casting composition,
(2) optionally degassing the composition,
(3) introducing the composition into a suitable mold, and
(4) effecting photopolymerization of the composition.

A multifunctional "urethane (meth)acrylate oligomer" or "(meth)acrylated urethane oligomer," refers to a material having multiple (meth)acrylate groups for rapid curing and development of a very high-density crosslinked network during polymerization. The three basic components of a urethane (meth)acrylate oligomer include a polyisocyanate, a polyol, and a (meth)acrylate capping agent.

The (meth)acrylate-terminated urethane oligomers are formed by providing (meth)acrylate-functional terminal groups on a polyisocyanate-terminated product having a molecular weight in the range of 400 to 5000, preferably 800 to 2500. While several production procedures are available, the diisocyanate-terminated product can be described as the reaction product of an organic polyisocyanate with an aliphatic molecule having two isocyanate-reactive hydrogen atoms, as may be provided by the hydroxy groups. These diisocyanate-terminated reaction products include from 2 to 10 urethane and/or urea or thiourea groups, preferably from 2 to 4 such groups.

In one embodiment, a stoichiometric excess of an aliphatic polyisocyanate is reacted with a polyol to produce an oligomer having a molecular weight ($M_w$) of from 400 to 5000, preferable from 800 to 2500, in which substantially all the terminal groups of the intermediate oligomer are isocyanate groups. This intermediate oligomer is then reacted with a stoichiometric equivalent amount of a hydroxyalkyl (meth)acrylate to yield the desired urethane (meth)acrylate oligomer. The polyol may be a simple aliphatic polyol, or may be a polyether, polyester or polyether-ester polyol, such as are known in the art. In another embodiment, a hydroxyalkyl (meth)acrylate is reacted with a polyisocyanate, followed by reaction with a polyol to produce the desired urethane (meth)acrylate oligomer Preferably the (meth)acrylate oligomer is a methacrylate oligomer, having terminal methacrylate rather than acrylate groups. The methacrylate groups provide cured compositions having higher glass transition temperatures than the corresponding acrylate oligomers. In some embodiments, the (meth)acrylate oligomer is chosen such that the $T_g$ of the homopolymer is greater than 50° C., preferably greater than 70° C., and more preferably greater than 80° C. It has been further observed that the acrylates homopolymerize at higher rates than methacylates, with the result that homopolymerization of acrylates competes with the thiol-ene reaction, with the result that unreacted thiol remains, and the $T_g$ of the cured composition is lower.

The aliphatic groups may be a simple alkylenediol, such as 1,6-hexane diol, but it is preferred that the aliphatic groups be selected from polyether, polyester and polyether-ester groups. Polyether groups are illustrated by polytetramethylene glycol, polyester groups by the ester reaction product of two moles of ethylene glycol with one mole of adipic acid, and polyether-ester groups by the ester reaction product of two moles of diethylene glycol with one mole of adipic acid.

(Meth)acrylate termination of the diisocyanates may be accomplished in various ways. Thus, one can form the higher molecular weight polyisocyanates first, and then react with appropriate molar proportions of hydroxy alkyl (meth)acrylate to thereby react one such unsaturated molecule with each available isocyanate group. These hydroxy alkyl (meth)acrylates may have from 2 to 6 carbon atoms in the alkyl group and are illustrated by 2-hydroxyethyl (meth)acrylate and by 2-hydroxypropyl (meth)acrylate. Correspondingly, one can first react the hydroxyalkyl (meth)acrylate with an excess of a low molecular weight diisocyanate and then react a stoichiometric proportion of the unsaturated monoisocyanate so-formed with a dihydroxy compound to provide a polyurethane with the desired molecular weight. Both procedures are known to the art.

A number of (meth)acrylated urethane oligomers are known. Properties of these materials may be varied depending upon selection of the type of isocyanate, the type of polyol modifier, the reactive functionality and molecular weight. Diisocyanates are widely used in urethane (meth)acrylate synthesis and can be divided into aromatic and aliphatic diisocyanates. Aromatic diisocyanates are used for manufacture of aromatic urethane (meth)acrylates that have significantly lower cost than aliphatic urethane (meth)acrylates but tend to noticeably yellow on exposure or aging. Aliphatic urethane (meth)acrylates include aliphatic diisocyanates that exhibit greater light stability (less tendency to yellow) than aromatic urethane (meth)acrylates that include the same functionality, a similar polyol modifier and a similar molecular weight and are therefore preferred.

Preferred aliphatic urethane (meth)acrylates include reactive multifunctional oligomers such as CN9001™, CN968™, CN982™, CN983™, CN985™, and CN1963™ from Sartomer Company of Exton, Pa., and EBECRYL™ 8201, 8301, 8302, from UCB Surface Specialties Inc. of Smyrna, Ga., and PHOTOMER™ 6008, 6019, 6184 from Cognis North America of Cincinnati, Ohio.

The polythiols used in the invention have at least two thiol groups and are preferably free of hydrophilic and free-radically polymerizable groups. Useful polythiols are also substantially free of disulfide linkages that would impart chemical and/or thermal instability to the crosslinked or cured network. The use of di-, tri-, and tetra-functional polythiols is also contemplated in the present invention. The polythiols may be aliphatic or aromatic (although aliphatic are preferred) and may be monomeric or polymeric. Since aromatic compounds are more susceptible to color formation, aliphatic polythiols are preferred. The polythiols may be used alone or in combination with one another.

Useful polythiols have the formula R—(SH)$_n$, where n is at least 2, and preferably 2-4, and R is an aliphatic organic group of valence n, having a plurality of —SH groups that are capable of reacting with the (meth)acryl group of the (meth) acrylated urethane oligomer. R may be a polymeric or non-polymeric organic group that has a valence of n and is preferably selected from polyvalent aliphatic compounds having 1 to 30 carbon atoms and optionally one to four catenary heteroatoms of oxygen, nitrogen or sulfur, and optionally one to four ester linkages; polyoxyalkylene, polyester, polyolefin, polyacrylate, or polysiloxane backbones. With respect to n, it will be recognized that mixtures of mono-, di- and higher thiols may be used and "n" may represent a non-integral average.

In one embodiment, R comprises a non-polymeric aliphatic or cycloaliphatic, moiety having from 1 to 30 carbon atoms. In another embodiment, R comprises a polyoxyalkylene, polyester, polyolefin, polyacrylate, or polysiloxane polymer having pendent or terminal reactive —SH groups. Useful polymers include, for example, thiol-terminated polyethylenes or polypropylenes, and thiol terminated poly(alkylene oxides).

Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or β-mercaptopropionic acid.

Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate) pentaerythritol tetrakis(3-mercaptopropionate), all of which are commercially available. A specific example of a preferred polymeric polythiol is polypropylene ether glycol bis(3-mercaptopropionate) which is prepared from polypropylene-ether glycol (e.g. Pluracol™ P201, BASF Wyandotte Chemical Corp.) and 3-mercaptopropionic acid by esterification. Poly-2-mercaptoacetate or poly-3-mercaptopropionate esters, particularly the trimethylolpropane triesters or pentaerythritol tetraesters are preferred.

Thiol terminated polysulfide resins may also be employed. Particularly useful highly functional polythiols include pentaerythritol tetrakis(3-mercaptopropionate) (PETMP), and trimethylolpropane tris (3-mercaptopropionate) (TMPTMP).

The composition according to the invention may comprise at least one reactive diluent. The reactive diluents can be used to adjust the viscosity of the composition. Thus, the reactive diluents can each be a low viscosity monomer containing at least one functional group capable of polymerization when exposed to actinic radiation. For example, vinyl reactive diluents and (meth)acrylate monomer diluents may be used.

The reactive diluent is preferably added in such an amount that the shrinkage of the cured compositions does not exceed around 7%, preferably not above around 5%. Suitable amounts of the reactive diluents have been found to be less than about 20 wt. %, and more preferably about 0% to about 10% by weight.

The reactive diluents generally have a molecular weight of not more than about 550 or a viscosity at room temperature of less than about 500 mPas (measured as 100% diluent).

The functional group present on the reactive diluents may be the same as that used in the radiation-curable urethane (meth)acrylate oligomer. Preferably, the radiation-curable functional group present in the reactive diluent is capable of copolymerizing with the radiation-curable functional group present on the radiation-curable oligomer.

The reactive diluent comprises monomers having a (meth) acrylate or vinyl functionality and a $C_1$-$C_{20}$ alkyl moiety. Examples of such reactive diluents are ethyl (meth)acrylate, isopropyl (meth)acrylate, t-butyl (meth)acrylate, cyclohexyl (meth)acrylate, isobornyl (meth)acrylate, isooctyl (meth) acrylate, stearyl (meth)acrylate and the like.

Furthermore, the reactive diluents preferably contain an average of two or more free-radically polymerizable groups. A diluent having three or more of such reactive groups can be present as well. Examples of such monomers include: $C_2$-$C_{18}$ alkylenedioldi(meth)acrylates, $C_3$-$C_{18}$ alkylenetrioltri(meth) acrylates, the polyether analogues thereof, and the like, such as 1,6-hexanedioldi(meth)acrylate, trimethylolpropanetri (meth)acrylate, , triethyleneglycoldi(meth)acrylate, pentaeritritoltri(meth)acrylate, and tripropyleneglycol di(meth) acrylate, and di-trimethylolpropane tetraacrylate.

Preferably, the oligomer and the at least one reactive diluent each contain (meth)acrylate groups as a radiation-curable group.

The composition may optionally further comprise at least one photoinitiator. The photoinitiator improves the rate of cure and percent conversion of the curable compositions, but the depth of cure (of thicker coatings or shaped articles) is deleteriously affected as the photoinitiator attenuates the transmitted light that penetrates the thickness of the sample. Additionally, the use of photoinitiators leads to increased yellowing and reduced transmission in optical articles and is therefore not preferred. The photoinitiator, when present, is used in an amount of less than 0.05 weight %, preferably less than 0.02 weight %. Most preferably, the composition contains no photoinitator.

If present, conventional photoinitiators can be used. Examples include benzophenones, acetophenone derivatives, such as α-hydroxyalkylphenylketones, benzoin alkyl ethers and benzil ketals, monoacylphosphine oxides, and bis-acylphosphine oxides. A preferred photoinitiator is ethyl 2,4, 6-trimethylbenzoylphenyl phosphinate (Lucirin TPO-L) available from BASF, Mt. Olive, N.J., 2 hydroxy-2-methyl-1-phenyl-propan-1-one (DAROCURE 1700™, Ciba Specialties). Another preferred example is 2,2-dimethoxy-2-phenyl acetophenone (IRGACURE 651™, Ciba Specialties). Other suitable photoinitiators include mercaptobenzothiazoles, mercaptobenzooxazoles and hexaryl bisimidazole. Often, mixtures of photoinitiators provide a suitable balance of properties.

The composition of the present invention may vary in amounts of components. In general, the molar amounts of (meth)acrylate groups are in excess of the amounts of thiol groups. At equimolar amounts, the $T_g$ of the resulting cured composition is too low to be useful in optical applications. The amounts of the two major components, the free-radically polymerizable ethylenically unsaturated groups of the urethane (meth)acrylate oligomer and the polythiol, may vary according to their molar equivalence in a ratio of about 40:1 to 2:1 of free-radically polymerizable ethylenically unsaturated groups (of the oligomer) to thiol groups (of the polythiol), preferred from about 10:1 to 3:1.

The compositions can then be applied to the desired substrate or added to a mold and exposed to actinic radiation such as UV light. The composition may be exposed to any form of actinic radiation, such as visible light or UV radiation, but is preferably exposed to UVA (320 to 390 nm) or UVV (395 to 445 nm) radiation. Generally, the amount of actinic radiation should be sufficient to form a solid mass that is not sticky to the touch. Generally, the amount of energy required for curing the compositions of the invention ranges from about 0.2 to 20.0 J/cm$^2$.

The composition and process for making optical elements of the present invention are believed to be applicable to a variety of applications needing optical elements including, for example, optical assemblies, optical projection systems, such as projection televisions, as well as displays and other devices containing the optical assemblies. The articles of this invention include articles that are currently prepared from ground glass, or injection molded plastic.

Such articles generally have a thickness of about 0.5 mm or greater, and can be prepared from photocurable composition of this invention which is made by mixing in a suitable vessel, in any convenient order, an aliphatic urethane (meth)acrylate oligomer, a polythiol, optionally a reactive diluent, and optionally <0.05 wt. % of a photoinitiator, to provide a composition that is melt processable at 100° C. or less. Mixing is continued until the components of the composition are in a single phase. Thicknesses of 25 mm have been achieved using the composition and process of this invention.

At the time of use, the composition is preferably degassed using a vacuum of less than about 25 Torr or by flowing the composition in a thin film past a suitable boundary. The degassed composition is introduced, optionally using a pressure of about 2 to 10 Kg/cm$^2$, into a mold corresponding to the shape of the article that is desired to be prepared. Such molds are generally made of plastic, glass and metal, or combinations thereof.

In one embodiment, the photopolymerizable composition may be applied to the surface of the mold having the requisite shape or to mold elements corresponding to the desired optical article, such as a lens. The volume of photopolymerizable composition that enters the mold or mold elements can be controlled by sliding a squeegee across the surface of the mold. The amount of photopolymerizable composition can also be applied by other known coating techniques, such as by the use of a roller. If desired, heating may be used to reduce the viscosity of the composition and provide more efficient molding. As described, many embodiments of the invention are melt-processable, i.e. possess or achieve a suitable low viscosity for coating or molding at temperatures less than or equal to 100° C.

The mold elements may be completely filled or may be partially filled. If the photopolymerizable composition is a 100% solids, non-shrinking, curable material, then the shape of the cured composition will remain the same as that of the mold elements. However, if the photopolymerizable composition shrinks as it hardens, then the liquid will contract, creating unreliable registration, and introducing optical defects. Preferably, the photopolymerizable composition includes materials that shrink by less than about 7% by volume, and preferably less than about 5%, during curing.

To initiate photopolymerization, the molds are filled as described above, placed under a source of actinic radiation such as a high-energy ultraviolet source having a duration and intensity of such exposure to provide for essentially complete (greater than 80%) polymerization of the composition contained in the molds. If desired, filters may be employed to exclude wavelengths that may deleteriously affect the reactive components or the photopolymerization. Photopolymerization may be effected via an exposed surface of the curable composition, or "through-mold" by appropriate selection of a mold material having the requisite transmission at the wavelengths necessary to effect polymerization.

Photoinitiation energy sources emit actinic radiation, i.e., radiation having a wavelength of 700 nanometers or less which is capable of producing, either directly or indirectly, free radicals capable of initiating addition polymerization and step-growth polymerization of the optical casting resins of this invention. Preferred photoinitiation energy sources emit ultraviolet radiation, i.e., radiation having a wavelength between about 180 and 460 nanometers, including photoinitiation energy sources such as mercury arc lights, carbon arc lights, low, medium, or high pressure mercury vapor lamps, swirl-flow plasma arc lamps, xenon flash lamps ultraviolet light emitting diodes, and ultraviolet light emitting lasers. Particularly preferred ultraviolet light sources are xenon flash lamps available from Xenon Corp, Wilburn, Mass., such as models RC-600, RC-700 and RC-747 pulsed UV-Vis curing systems.

EXAMPLES

These examples are for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation of Trade Name | Description |
| --- | --- |
| PETMP | Pentaerythritol tetrakis(3-mercaptopropionate) available from Dow Chemical Company, Midland, MI |
| TMPTMP | Trimethylolpropane tris(3-mercaptopropionate) available from Dow Chemical Company, Midland, MI |
| CN1963 | Aliphatic urethane methacrylate oligomer containing 25% TMPTMA as reactive diluent available from Sartomer Company Inc, Exton, PA |
| Pro7327 | Aliphatic urethane methacrylate oligomer containing no reactive diluent (i.e. CN1963 without TMPTMA) available from Sartomer Company Inc, Exton, PA |
| TMPTMA | Trimethylolpropane trimethacrylate, SR350, available from Sartomer Company Inc, Exton, PA |
| Lucirin TPO-L | Ethyl 2,4,6-trimethylbenzoylphenyl phosphinate, available from BASF, Mt. Olive, NJ |
| HDDMA | 1,6-Hexanediol dimethacrylate, SR239, available from Sartomer Company Inc, Exton, PA |
| A31 Release Liner | A silicone liner from DuPont Teijin Films U.S. Limited Partnership, Wilmington, DE |

Test Methods

Dynamic Mechanical Analysis (DMA) Measurement

This measurement allows one to determine the Tg and modulus of a cured composition. The measurement was operated on a LC-ARES Test Station (Rheometric Scientific, Piscataway, N.J.) in torsion mode. The sample size is approximately 25 mm by 10 mm by 1 mm. The length of the sample was measured by the test station and the width and thickness of the sample were measured by a caliper. The test was performed by ramping the temperature from 25° C. to 180° C. at 5° C. per minute. The frequency used was 1 Hz.

Transmittance a* and b* Measurement

Transmittance (380 nm to 720 nm) and CIELAB a* and b* were measured by using a TCS Plus Spectrophotometer (Byk-Gardner USA, Silver Spring, Mo.). The sample size was a round disc 3.2 centimeters (1.25 inches) in diameter and 0.48 centimeters (3/16 inch) thick.

Volume Shrinkage Determination

The curable composition's density was calculated based on the density of each component. The cured composition's density was measured by an Ultrapycnometer 1000 (QuantaChrome, Boynton Beach, Fla.). The gas pycnometer was calibrated by using PMMA with a density of 1.29 grams/milliliter. The system was purged with Helium at a pressure of 138 kiloPascals (20 psi). The cured composition's density was an average of ten measurements with a standard deviation less than 0.001. Alternatively, the density was measured with a water pycnometer, (VWR Scientific, West Chester, Pa.). Volume shrinkage (%) was calculated by the change in density before and after cure.

Examples 1-9 and Comparative Examples C1 and C2

Curable mixtures were prepared by preheating urethane acrylate or methacrylate oligomers, initiator (if used), thiol and crosslinker (if used) at 80° C. and mixing in a white disposable cup by Model DAC-100 mixer (available from FlackTek Inc, Landrum, N.J.) using the composition amounts shown in Table 1. The compositions were degassed in a vacuum chamber and then allowed to cool to room temperature before use. The weighing and mixing steps were carried out in ordinary laboratory lighting. Curing of the above mixtures was carried out by the following steps: 1) Onto a Pyrex glass plate approximately 15.2×15.2×0.48 centimeters (6×6×3/16 inches) was placed an approximately 15.2×15.2 centimeters (6×6 inches) piece of 51 micrometer thick A31 release liner; 2) on top of the release liner was placed an approximately the same size glass or silicone rubber mold with a 3.2 centimeters (1.25 inch) diameter opening at the center; 3) then the mold was filled with the curable composition taking care to avoid bubbles, 4) then a second piece of approximately 15.2×15.2 centimeters (6×6 inches) piece of 51 micrometer thick A31 release liner was placed on top of the filled mold; 5) another Pyrex glass plate approximately 15.2×15.2×0.48 centimeters (6×6×3/16 inches) was placed on top of the release liner; and 6) finally, the setup was placed onto a heating station at 80° C. in a chamber and allowed to equilibrate. The curable compositions were cured by a Xenon flash lamp (Model #4.2 Lamp Hsg, pulse rate of 8 Hz) with RC-747 Pulsed UV/Visible System (Xenon Corporation, Woburn, Mass.) for 5 minutes. The $T_g$, which was measured by a Dynamic Mechanical Analysis (DMA), CIELAB a* and b* which were measured by the TCS Plus Spectrophotometer, and percent volume shrinkage, which was determined by a pycnometer are shown in Table 2. % transmittance, measured by the TCS Plus Spectrophotometer, is shown in FIG. 1.

TABLE 1

|  | Oligomer (parts) | PETMP (parts) | TMPTMP (parts) | TMPTMA (parts) | HDDMA (parts) | TPO-L (parts) |
|---|---|---|---|---|---|---|
| Comparative Example C1 | CN1963100 | — | — | — | — | 0.10 |
| Comparative Example C2 | Pro7327100 | — | — | — | — | 0.10 |
| Example 1 | Pro7327100 | 3.8 | — | — | — | — |
| Example 2 | Pro732790 | 7 | — | — | 10 | — |
| Example 3 | Pro732795 | 6 | — | — | 5 | — |
| Example 4 | Pro7327100 | — | 4.4 | — | — | — |
| Example 5 | Pro732795 | — | 5.3 | — | 5 | — |
| Example 6 | Pro732789 | 1 | — | 10 | — | — |
| Example 7 | Pro732780 | 10 | — | 10 | — | — |
| Example 8 | Pro732798 | 1 | — | 1 | — | — |
| Example 9 | Pro732789 | 5.5 | — | 5.5 | — | — |

TABLE 2

|  | Tg (° C.) | Volume Shrinkage (%) | a* | b* |
|---|---|---|---|---|
| Comparative Example C1 | 93 | 6.8 | −0.48 | 2.12 |
| Comparative Example C2 | 97 | 3.6 | −0.31 | 1.91 |
| Example 1 | 77 | 3.5 | −0.06 | 0.37 |
| Example 2 | 77 | 4.9 | −0.04 | 0.48 |
| Example 3 | 80 | 4.2 | −0.06 | 0.55 |
| Example 4 | 88 | 3.4 | −0.23 | 0.69 |
| Example 5 | 88 | 4.5 | −0.11 | 0.64 |
| Example 6 | — | 4.9 | −0.04 | 0.72 |
| Example 7 | — | 3.3 | −0.01 | 0.78 |
| Example 8 | — | 4.3 | −0.06 | 0.70 |

The invention claimed is:

1. A photocurable composition comprising
   a) greater than 90 to 99.5 wt. % of an aliphatic urethane (meth)acrylate oligomer,
   b) 0.5 to 10 wt. % of a polythiol,
   c) 0 to 10 wt. % of a (meth)acrylate reactive diluent, and
   d) 0 wt. % of a photoinitiator,
   where the weight percents are based on 100 wt. % of components a, b, c and d where the ratio of (meth) acrylate groups of the urethane (meth)acrylate oligomer to the thiol groups of the polythiol is 40:1 to 2:1.

2. The photocurable composition of claim 1 wherein said aliphatic urethane (meth)acrylate oligomer comprises the reaction product of a polyisocyanate, a polyol and a (meth)acrylate capping agent.

3. The photocurable composition of claim 1 wherein said polythiol is of the formula R—(S—H)$_n$, where R is an organic moiety having a valence of n, and n is at least 2.

4. The photocurable composition of claim 3 wherein R is a non-polymeric aliphatic, cycloaliphatic, aromatic or alkyl-substituted aromatic moiety having from 1 to 30 carbon atoms and optionally 1 to four catenary heteroatoms of oxygen, nitrogen or sulfur.

5. The photocurable composition of claim 3 wherein said polythiol is obtained by esterification of a polyol with a terminally thiol-substituted carboxylic acid.

6. The photocurable composition of claim 1 wherein said reactive diluent comprises monomers having a (meth)acrylate or vinyl functionality, and a $C_1$-$C_{20}$ alkyl or polyether moiety.

7. The photocurable composition of claim 1 wherein said aliphatic urethane (meth)acrylate oligomer is a methacrylate oligomer.

8. The photocurable composition of claim 1 having 0 wt. % of a reactive diluent.

9. The photocurable composition of claim 1 where the ratio of (meth)acrylate groups of the urethane (meth)acrylate oligomer to the thiol groups of the polythiol is 10:1 to 3:1.

10. A polymer comprising the reaction product of claim 1.

11. The polymer of claim 10 exhibiting shrinkage of less than 7% by volume.

12. The polymer of claim 10 exhibiting a birefringence of less than $1 \times 10^{-5}$.

13. The polymer of claim 10 having a Tg of >50° C.

14. The polymer of claim 10 having a CIELAB b* value of less than 1.5.

15. The polymer of claim 10 having an index of refraction greater than about 1.45 and less than about 1.75.

16. The polymer of claim 10 having light transmission greater than about 85%.

17. A shaped article comprising the polymer of claim 10.

18. The shaped article of claim 17 comprising a lens.

19. A method of making an optical article comprising providing a mold, adding the composition of claim 1 to the mold, and exposing to UV radiation.

20. The method of claim 19 wherein the optical element is greater than 0.5 mm in thickness.

* * * * *